United States Patent [19]

Heiermann

[11] 4,346,903
[45] Aug. 31, 1982

[54] HIGH-PRESSURE SEAL IN PISTON

[75] Inventor: Siegfried Heiermann, Waltrop, Fed. Rep. of Germany

[73] Assignee: Klockner-Werke AG, Duisburg, Fed. Rep. of Germany

[21] Appl. No.: 245,095

[22] Filed: Mar. 18, 1981

[30] Foreign Application Priority Data

Mar. 18, 1980 [DE] Fed. Rep. of Germany ... 8007319[U]

[51] Int. Cl.³ .............................................. F16J 15/18
[52] U.S. Cl. ......................................... 277/58; 277/1;
277/165; 277/188 R; 277/125; 92/251
[58] Field of Search ................. 277/58, 1, 60, 27, 165,
277/177, 178, 188 R, 188 A, 123, 125;
92/250–252, 259

[56] References Cited

U.S. PATENT DOCUMENTS

| 2,747,954 | 5/1956 | Damm et al. | 277/188 A X |
| 2,797,971 | 7/1957 | Greenbugh | 277/188 A X |
| 2,935,365 | 5/1960 | Dega | 277/165 |
| 3,071,386 | 1/1963 | Scannell | 277/177 |
| 3,971,298 | 7/1976 | Kulig | 92/252 X |

FOREIGN PATENT DOCUMENTS 1248517 11/1960 France .................................. 92/251
668356 3/1952 United Kingdom ................ 277/165

Primary Examiner—Robert S. Ward, Jr.
Attorney, Agent, or Firm—Watson, Cole, Grindle & Watson

[57] ABSTRACT

A high-pressure seal having a dynamic seal ring and a static seal ring supported by a backup ring is improved upon such that support ring is a one-piece construction having sealing chambers respectively defined together with the bore wall of the cylinder with the piston recess for the dynamic and static seal rings. The seal chamber for the static seal ring is formed to induce a stretching of this ring when the high-pressure seal is assembled in place, whereby the seal between the piston and cylinder is improved as the static seal ring is stretched to provide a tight seal between the backup ring and the piston.

4 Claims, 1 Drawing Figure

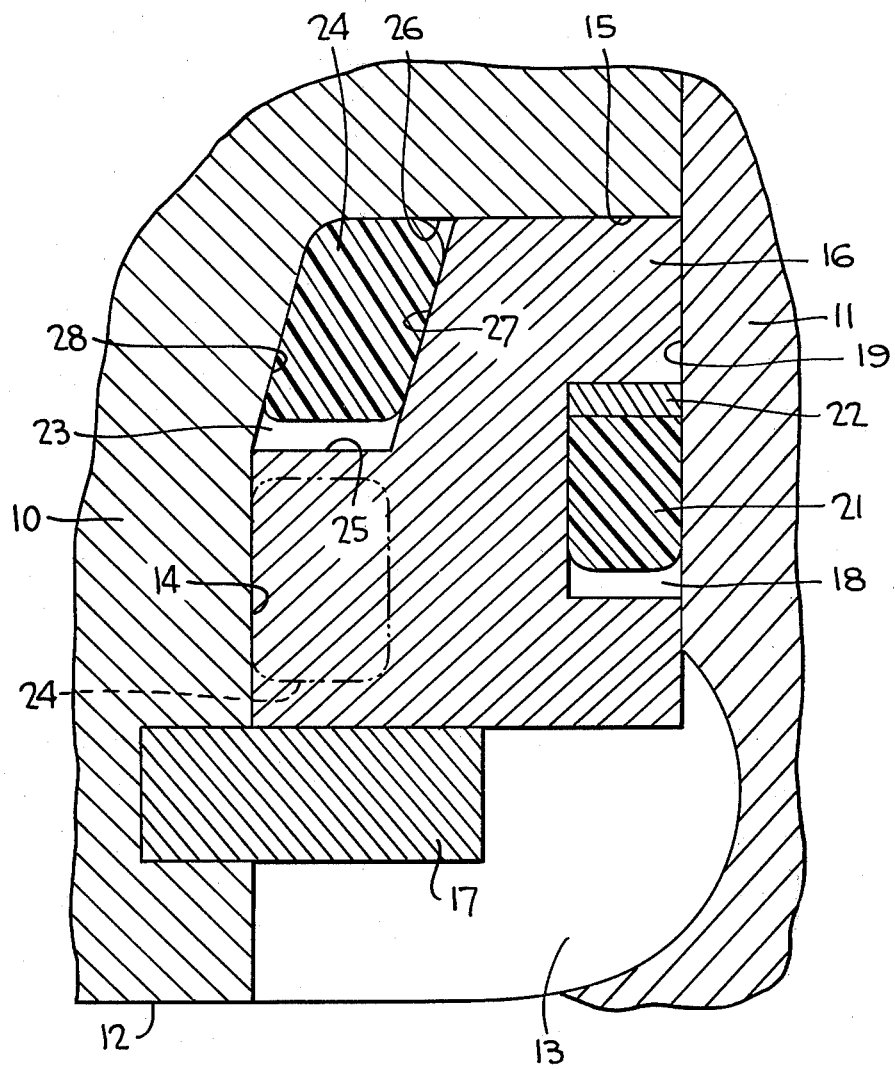

HIGH-PRESSURE SEAL IN PISTON

BACKGROUND OF THE INVENTION

This invention relates generally to a high-pressure seal which includes a backup support ring disposed in the annular recess of a piston in a piston and cylinder arrangement, the ring support dynamic and static annular seals. More particularly, the invention relates to an improvement in the seal between the piston and the cylinder.

In those piston and cylinder arrangements with the cylinders having large bore diameters of, for example 200 mm. and more, it has been difficult to seal the cylinders against high pressures since the gap between the piston and cylinder to be sealed increases for such large cylinders under the effect of the high pressure due to the elastic deformation of the seal rings. Moreover, prior art high-pressure seals have been difficult to fabricate and to install.

SUMMARY OF THE INVENTION

It is, therefore, an object of the present invention to improve upon high-pressure seals between the piston and the cylinder in such a manner that the seal can be more easily fabricated and more quickly and easily mounted in place.

The high-pressure seal according to the invention includes a one-piece backup support ring defining together with the cylinder wall an annular sealing chamber in which is located an annular, elastomeric dynamic seal ring, the support ring further defining together with the piston another annular sealing chamber in which is located an annular, elastomeric static seal ring. This other sealing chamber is defined by a pair of spaced apart end faces and a pair of spaced apart conical faces extending therebetween. The annular recess in the piston has an annular side wall lying parallel to the piston axis, and an end wall lying perpendicular thereto. The conical faces slope radically outwardly in a direction toward such end wall, and the static seal initially encircles the side wall and is shifted into place within its sealing chamber by the support ring upon assembly. The static seal is radially expanded by the conical faces when disposed in its sealing chamber so as tightly engage the piston, whereby to improve the seal between the piston and the cylinder under the effect of high pressure.

Other objects, advantages and novel features of the invention will become more apparent from the following detailed description of the invention when taken in conjunction with the accompanying drawing.

BRIEF DESCRIPTION OF THE DRAWING

The single drawing FIGURE is an axial sectional view of part of a piston and cylinder arrangement illustrating the details of the invention.

DETAILED DESCRIPTION OF THE INVENTION

Turning now to the drawing wherein like reference characters refer to like corresponding parts throughout the single view, a portion of a piston 10 is shown in relation of a portion of a cylinder 11 in which the piston operates in a typical piston and cylinder arrangement. An annular recess is formed in the piston adjacent terminal end 12 of the piston, the piston being shown relative to the cylinder toward the end of the piston instroke. A typical high-pressure area, such as 13, is defined between the cylinder and the piston at the location shown in the drawing.

The piston recess is formed by an annular side wall 14 lying parallel to the piston axis, and an end wall 15 lying perpendicular thereto. The high-pressure seal is mounted within this recess and, according to the invention, comprises a one-piece backup support ring 16 in engagement with walls 14 and 15 and being locked into position by a piston snap ring 17, or the like. The support ring has an annular sealing chamber 18 therein defined together with bore wall 19 of the cylinder, and an annular, elastomeric dynamic seal ring 21 is disposed in chamber 18 in sealing engagement with bore wall 19. An annular spacer ring 22 is likewise disposed within chamber 18.

Support ring 16 further has an annular sealing chamber 23 defined together with piston 10, and an annular, elastomeric seal ring 24 is disposed in this sealing chamber 23 in a manner to be more fully described hereinafter. Chamber 23 is defined by an end face 25 on the support ring and lying parallel to end wall 15, a spaced apart end face 26 formed as an extension of end wall 15, an annular conical support face 27 in support ring 17, and an annular conical support face 28 in the piston which smoothly interconnects walls 14 and 26. Conical faces 27 and 28 are concentric and slope radially outwardly in a direction toward end wall 15.

Prior to the assembly of the high-pressure seal according to the invention into place within the piston recess, dynamic seal ring 21 together with spacer ring 22 are disposed in sealing chamber 18, and static seal ring 24 is fitted around annular side wall 14 in a position shown in phantom outline in the drawing Figure. The backup support ring, together with the dynamic seal ring and spacer in place, is then shifted into position in a direction from end 12 of the piston toward end wall 15. In the process, static seal ring 24 slides along walls 14 and 28, and along wall 27 until it comes to rest upon engagement with end face 26, as shown in solid outline drawing. Because of the radially outward slope of conical faces 27 and 28, seal ring 24 assumes the shape shown in the drawing and stretches into an increase diameter. The thus expanded static seal ring tightly engages walls 26, 27 and 28 to thereby improve upon the seal between the piston and the suport ring and, in turn, between the piston and the cylinder. Lock ring 17 is then installed by snapping it or otherwise securing it in place.

It can be therefore seen that the high-pressure seal according to the invention can be easily mounted in place, and functions to improve upon the seal between the piston and cylinder by more tightly sealing between the backup support ring and the piston.

Obviously, many modifications and variations of the present invention are made possible in light of the above teachings. It is to be therefore understood that within the scope of the appended claims the invention may be practiced otherwise than as specifically described.

What is claimed is:

1. In a piston and cylinder arrangement wherein the piston has an annular recess therein adjacent a high-pressure area defined between the piston and the wall of the cylinder, high-pressure seal means mounted in said recess, comprising: a one-piece backup support ring defining together with the cylinder wall a first, annular sealing chamber; an annular, elastomeric dynamic seal ring disposed in said chamber; said support ring further defining together with the piston a second, annular sealing chamber; an annular, elastomeric static seal ring disposed in said second chamber; said second chamber being defined by a pair of spaced apart end faces and a pair of spaced apart conical faces extending therebetween; said recess having an annular side wall lying parallel to the piston axis and an end wall lying perpendicular thereto; said conical faces sloping radially outwardly in a direction toward said end wall; and said static seal initially encircling said side wall and being shifted into said second sealing chamber by said support ring upon assembly thereof; said static seal being radially expanded by said conical faces when disposed in said second sealing chamber to thereby tightly engage said piston, whereby to improve the seal between said piston and said cylinder.

2. The high-pressure seal means according to claim 1, wherein said support ring contains one of said end faces, and said piston contains the other of said end faces, and said piston contains the other of said end faces.

3. The high-pressure seal means according to claim 1, wherein said support ring contains one of said conical faces and said piston contains the other of said conical faces.

4. The high-pressure seal means according to claim 1, 2 or 3, wherein said conical faces are concentric.

* * * * *